Jan. 30, 1934.	A. H. HANDLAN	1,945,190
LENS FOR SIGNAL LAMPS
Filed June 28, 1926
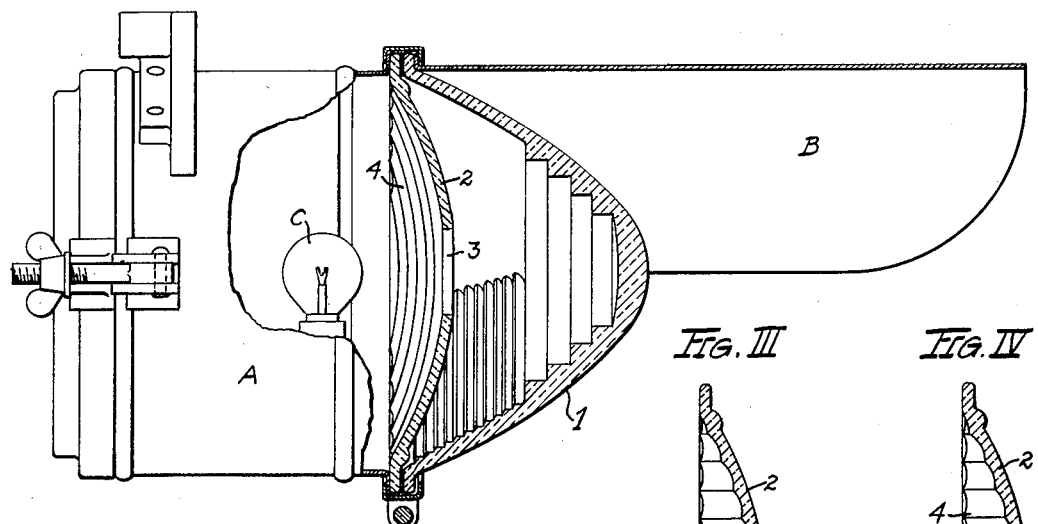
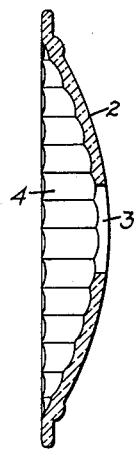
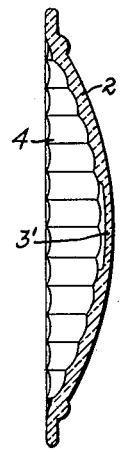
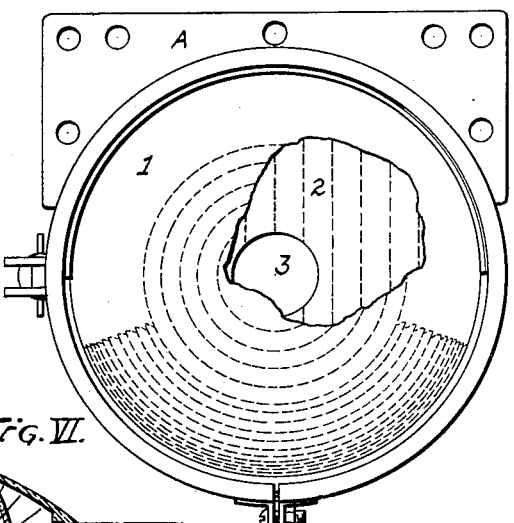
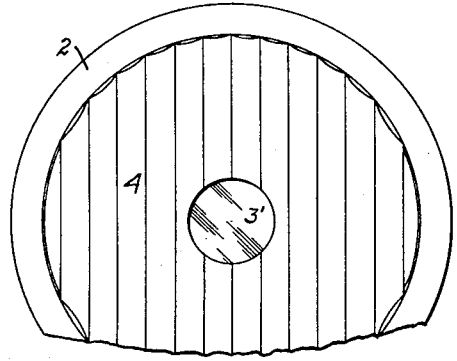
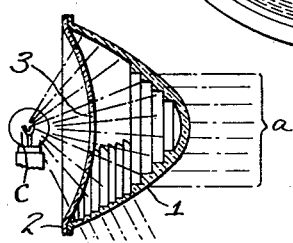
INVENTOR
A. H. HANDLAN
By Cook & McCauley
ATTORNEYS Patented Jan. 30, 1934

1,945,190

UNITED STATES PATENT OFFICE 1,945,190

LENS FOR SIGNAL LAMPS

Alexander H. Handlan, St. Louis, Mo.

Application June 28, 1926. Serial No. 118,931

4 Claims. (Cl. 177—329)

My invention relates to lenses for a signal lamp provided with an incandescent light bulb, said lenses being so arranged that a portion of the light from said bulb may be projected unaffected through the central portion of one of said lenses while the remainder of the lens is so arranged as to diffuse the remaining light issuing from said bulb. The primary object of my invention is to obtain unaffected rays of light from the bulb which are converted into a beam by an optical lens, preferably in front of my improved lens, that is, furthest from the bulb, and while so obtaining said unaffected portion of light from the bulb, diffusion of the remainder of the light from said bulb is also obtained by means of my improved lens, so that the indicating signal projected by said signal lamp may be observable. In the daytime when the position of the sun may be such with respect to the ordinary signal lamp that the beam of light may not be observable if the observer is not in approximately direct line with said beam of light, the importance of my improvement may be appreciated as the diffused portion of the light from the bulb renders the signal clearly observable even though the observer is not in direct line with the beam of light issuing from the signal lamp.

Many attempts have been made, particularly with railroad signal lamps, to obtain not only a highly intensified beam of light that may be seen for a relatively great distance, but also diffusion of the light from the incandescent bulb so that said signal may be plainly observable even when the position of the observer is such that it is difficult to observe the light of said signal due to the observer being out of direct line with the beam of light issuing from the signal lamp. With a signal lamp located at or near a curve around which a train may be traveling at high speed, the engineer is out of direct line with the beam of light that may be projected by said signal lamp, and it is highly important, when the sun is in such position with respect to said signal that it is difficult to observe the light of said signal, that the engineer be enabled to know just what signal is being projected by such signal lamp. For this reason lenses of the "roundel" type having ribs or ridging have been employed with optical lenses to obtain such diffusion.

My especial object as embodied in my improvement herein is to maintain a highly intensified beam of light and yet so diffuse a portion of the light from the bulb that the signal may be observable by the engineer and distinguishable by him from any point at which the signal may be seen by him.

The optical lens usually employed in a signal lamp is a lens which converts the light rays from the bulb into a beam which may be seen at a relatively great distance. The diffusing lens employed in such signal lamps, commonly termed a "roundel" lens, is non-magnifying and may be of appropriate signaling color. Ordinarily the "roundel" lens is placed in immediate juxtaposition to the optical lens and is closest to the light bulb, that is, the optical lens is on the outside and the diffusing lens on the inside of the signal lamp. As I have said before, the "roundel" diffusing lens ordinarily employed is appropriately ridged, ribbed, or hatched so as to break up or diffuse the light from said bulb. When this is done, however, the beam of light is greatly minimized and its highly important value in signaling service is lost.

With the foregoing and other objects in view, the invention comprises the novel construction, combination and arrangement of parts hereinafter more specifically described and illustrated in the accompanying drawing, wherein is shown the preferred embodiment of the invention. However, it is to be understood that the invention comprehends changes, variations and modifications which come within the scope of the claims hereunto appended.

Fig. I is a side elevation, partly in section, of a signal lamp showing my improved lens.

Fig. II is a front elevation of a signal lamp with the optical lens partly broken away to illustrate a section of my improved lens in the back thereof.

Fig. III is a cross-sectional view of one form of my improved lens.

Fig. IV is a cross-sectional view of another form of my improved lens.

Fig. V is a rear elevational view, partly broken away, of the lens shown in Fig. IV.

Fig. VI is a diagrammatical view indicating the paths of light rays passing from the light source through the lenses.

In the drawing A designates a signal lamp of ordinary construction, B the hood extending forwardly of said lamp, and C the incandescent light bulb used in said lamp. 1 designates an optical lens so made as to have the power of concentrating the light rays and thus converting the light cast by the bulb C into a beam. 2 is a non-magnifying lens, preferably of the "roundel" type, mounted in close proximity to the inner edge of the optical lens 1. 3 is the central section of this non-magnifying lens through which the rays of light from the bulb C is projected. This central section may be an aperture, as shown at 3 (Fig. III) or a section of plain, unribbed glass, as shown at 3' (Figs. IV and V). This non-magnifying lens may be ribbed, as shown at 4, or ridged or hatched in any other way to provide for breaking up or diffusing the light cast by the bulb C.

Preferaly the non-magnifying lens is appropriately colored, either red, green or yellow, to give the desired signal light. In this event said lens is made as shown in Figs. IV and V, with the unobstructed central glass 3' of the same color as the rest of said lens. If, however, the optical or magnifying lens 1 is made of the appropriate signaling color, such as red, green or yellow, then the non-magnifying lens may be made of clear uncolored glass having appropriate diffusing ribs, or ridges, thereon and with an aperture 3 in the center thereof, as shown in Fig. III.

It will be observed from the foregoing that rays of light from the bulb C will be projected either through the aperture 3, or the plain glass section 3', of the non-magnifying lens, and that these rays of light will be converted into a beam by the lens 1, so that said beam of light is projected to a relatively great distance as indicated by the lines designated by the reference character $a$ in Fig. VI. In addition the diffusing section of the non-magnifying lens 2 will break up and diffuse the light cast by the bulb C, so that in addition to the beam of light such diffused light will also be picked up and concentrated by the optical lens 1 as indicated by the lines designated by the reference character $b$ in Fig. VI, making the signal visible and the character of signal denoted observable from any point from which said signal lamp may be observed with respect to its forward or signaling end. As already pointed out, this is of the utmost importance, particularly where the observer is not in line with the beam of light projected by said signaling lamp, and when the sun is shining and in such position as might tend to render the signal light less discernible.

When a clear glass, non-magnifying "roundel" lens is employed, the appropriate signaling color being embodied in the optical lens, a small circular aperture which is employed in the central part of said "roundel" lens permits the maximum intensity of light cast by the bulb C to pass through to the optical lens. Any glass, even though clear, absorbs a certain amount of the light intensity of the bulb C.

As shown clearly in Figs. I and II of the drawing, the lower rear portion of the beam forming lens 1 may advantageously be provided with ridges (or grooves) for refracting and diffusing downwardly rays projected from the lighting element C, in order that one standing directly, or laterally, beneath the signal lamp will be able to determine easily and accurately the color of the beam that is being projected forwardly from the lamp. Such a provision is extremely desirable in instances where a plurality of different colored lighting units are mounted within the lamp casing for the purpose of giving various signals, and where it is essential that one, as, for example, an engineer rapidly approaching the lamp from ahead or from around a curve, should be able to identify the color of the beam constantly up to the point of passing the signal, in order that he may determine up to the instant of passing the condition of the track that lies before him.

I claim:

1. In a signal lamp the combination of a light unit, an inner lens which receives rays of light from said light unit, said inner lens having diffusing ribs adapted to spread light rays issuing from said light unit in a horizontal plane and being provided with a central, unribbed portion through which rays of light pass in an undiffused condition, and an outer lens provided with a central beam-producing portion, which serves to project light rays passing through said central portion of said inner lens as a beam, and a rim portion having ribs arranged substantially concentric with the central beam-producing portion which diffuse the light rays falling on said ribs in a plane substantially normal to the ribs.

2. In a signal lamp the combination of a light unit, an inner lens which receives rays of light from said light unit, said inner lens having vertical diffusing ribs adapted to spread light rays issuing from said light unit in a horizontal plane and being provided with a central, unribbed portion through which rays of light pass in an undiffused condition, and an outer lens provided with a central beam-producing portion, which serves to project light rays passing through said central portion of said inner lens as a beam, and a rim portion having ribs arranged substantially concentric with the central beam-producing portion which diffuse the light rays falling on said ribs in a plane substantially normal to the ribs.

3. In a signal lamp the combination of a light unit, an inner lens which receives rays of light from said light unit, said inner lens having diffusing ribs adapted to spread the light rays issuing from said light unit in a horizontal plane and being provided with a central aperture through which rays of light pass in an undiffused condition, and an outer lens provided with a central beam-producing portion, which serves to project light rays passing through said central aperture of said inner lens as a beam, and a rim portion having ribs arranged substantially concentric with the central beam-producing portion which diffuse the light rays falling on said ribs in a plane substantially normal to the concentric ribs.

4. In a signal lamp the combination of a light unit, an inner lens which receives rays of light from said light unit, said inner lens having diffusing ribs adapted to spread the light rays issuing from said light unit in a horizontal plane and being provided with a central aperture through which rays of light pass in an undiffused condition, and an outer lens provided with a central beam-producing portion, which serves to project light rays passing through said central aperture of said inner lens as a beam, and a rim portion having ribs arranged substantially concentric with the central beam-producing portion, and at the lower portion of said outer lens, which diffuse the light rays falling on said ribs in a plane substantially normal to the concentric ribs.

ALEXANDER H. HANDLAN.